United States Patent
Tran et al.

(10) Patent No.: US 9,235,527 B2
(45) Date of Patent: Jan. 12, 2016

(54) MULTIPLE-CACHE PARALLEL REDUCTION AND APPLICATIONS

(71) Applicants: Trac Duy Tran, Baltimore, MN (US); Dung Trong Nguyen, Baltimore, MD (US); Anh Nguyen Dang, Baltimore, MD (US)

(72) Inventors: Trac Duy Tran, Baltimore, MN (US); Dung Trong Nguyen, Baltimore, MD (US); Anh Nguyen Dang, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 252 days.

(21) Appl. No.: 13/947,561

(22) Filed: Jul. 22, 2013

(65) Prior Publication Data

US 2014/0025895 A1    Jan. 23, 2014

Related U.S. Application Data

(60) Provisional application No. 61/673,980, filed on Jul. 20, 2012.

(51) Int. Cl.
 *G06F 12/08*   (2006.01)
 *G06T 1/20*   (2006.01)

(52) U.S. Cl.
 CPC .............. *G06F 12/0875* (2013.01); *G06T 1/20* (2013.01); *G06F 2212/455* (2013.01); *Y02B 60/1225* (2013.01)

(58) Field of Classification Search
 None
 See application file for complete search history.

(56) References Cited

U.S. PATENT DOCUMENTS

| | | | | |
|---|---|---|---|---|
| 5,943,445 | A | * | 8/1999 | Dufaux .......................... 382/236 |
| 6,950,908 | B2 | * | 9/2005 | Shibayama et al. ........... 711/144 |
| 8,166,479 | B2 | * | 4/2012 | Roberts et al. ................. 718/100 |
| 2011/0320719 | A1 | * | 12/2011 | Mejdrich et al. ............... 711/120 |

FOREIGN PATENT DOCUMENTS

| | | |
|---|---|---|
| WO | 2007021552 A2 | 2/2007 |
| WO | 2009142858 A2 | 11/2009 |
| WO | 2010039898 A2 | 4/2010 |
| WO | 2010121228 A2 | 10/2010 |
| WO | 2011126774 A2 | 10/2011 |

OTHER PUBLICATIONS

Amdahl, Validity of the Single Processor Approach to Achieving Large Scale Computing Capabilities, Spring Joint Computer Conference, 1967, New York, New York, USA, pp. 483-485.

Anderson, et al., SETI@home: An Experiment in Public-Resource Computing, Communications of the ACM, 2002, 45(11):56-61.

Anthes, The Power of Parallelism, Computerworld, Nov. 19, 2001, 2 pages.

(Continued)

*Primary Examiner* — Gary Portka
(74) *Attorney, Agent, or Firm* — Quarles & Brady, LLP

(57) ABSTRACT

In accordance with an aspect of the present invention, a method and system for parallel computing is provided, that reduces the time necessary for the execution of program function. In order to reduce the time needed to execute aspects of a program, multiple program threads are executed simultaneously, while thread 0 of the program is also executed. These threads are executed simultaneously with the aid of at least one cache of the computing device on which the program is being run. Such a framework reduces wasted computing power and the time necessary to execute aspects of a program.

13 Claims, 11 Drawing Sheets

(56) References Cited

OTHER PUBLICATIONS

Asanovic, et al., The Landscape of Parallel Computing Research: A View from Berkeley, Technical Report No. UCB/EECS-2006-183, Electrical Engineering and Computer Sciences, University of California at Berkeley, Dec. 18, 2006, 56 pages.

Becla, et al., Lessons Learned from Managing a Petabyte, Presented at the Conference on Innovative Data Systems Research, 2005, 14 pages.

Dublin, New GPUs Set AMBER Performance Record, http://www.genomeweb.com/blog/new-nvidia-gpus-set-amber-record, 2011, 9 pages.

Fatahalian, et al., A Closer Look at GPUs, Communications of the ACM, 2008, 51(10):50-57.

Flynn, Some Computer Organizations and Their Effectiveness, IEEE Transactions on Computers, 1972, C-21 (9):948-960.

Gantz, et al., Extracting Value from Chaos, State of the Universe: An Executive Summary, IDC iView, 2011, pp. 1-12.

Gustafson, Reevaluating Amdahl's Law, Communications of the ACM, 1988, 31(5):532-533.

Hwu, et al., The Concurrency Challenge, IEEE Design & Test of Computers, 2008, 25(4):312-321.

Jain, et al., Clustering Big Data, Department of Computer Science, Michigan State University, Sep. 19, 2012, 59 pages.

KHRONOS OpenCL Working Group, The OpenCL Specification, Version 1.0, Document Revision 29, 2008, 302 pages.

Kirschenmann, et al., Parallel SPn on Multi-Core CPUS and Many-Core GPUS, Transport Theory and Statistical Physics, 2011, 39(2-4):255-281.

Korpela, et al., SETI@home-Massively Distributed Computing for SETI, Computing in Science & Engineering, 2001, 3(1):78-83.

Lindholm, et al., NVIDIA Tesla: A Unified Graphics and Computing Architecture, IEEE Micro, 2008, 28(2):39-55.

McKendrick, The Petabyte Challenge: 2011 IOUG Database Growth Survey, Aug. 2011, Produced by Unisphere Research, 41 pages.

NVIDIA Corporation, NVIDIA CUDA Compute Unified Device Architecture Programming Guide, Version 0.8.2, Apr. 24, 2007, 105 pages.

Owens, et al., GPU Computing, Proceedings of the IEEE, 2008, 96(5):879-899.

Satish, et al., Designing Efficient Sorting Algorithms for Manycore GPUs, IEEE International Symposium on Parallel & Distributed Processing, 2009, 14 pages.

Sutter, et al., Software and the Concurrency Revolution, ACM Queue, 2005, 3(7):54-62.

\* cited by examiner

1: function MULTI_CACHE_KERNEL($x_1, x_2, ..., x_C$)
2:     CACHE[$i$][:] ← $x_i$  $\forall i \in \{1, ..., C\}$
3:     for $iter = 1 : (K_C - 1)$ do     ▷ Folding stage
4:         $nFlops \leftarrow C/2^{iter}$
5:         for $iter = 1 : nFlops$ do
6:             each thread performs $nFlops$ pairwise sums in $nFlops$ corresponding CACHEs
7:         end for
8:     end for
9:     for $iter = K_C : K$ do     ▷ Single-operation stage
10:        $cacheIdx \leftarrow threadIdx/C$
11:        if ($cacheIdx < C$)
12:            performs 1 pairwise sum in CACHE[$cacheIdx$][:]
13:    end for
14:    if ($threadIdx < C$) return CACHE[$threadIdx$][0]     ▷ return $C$ outputs
15: end function

FIG. 10A

```
const int MAX_THREADS_PER_BLOCK = 128;
const int CACHE_SIZE = 256;
const int CACHE_SIZE_LOG = 8;

__global__ void vm_product_16_GPU(const float* v,const float* A, float* out, int rows, int
cols){
// use 16 caches
    __shared__ float cache[16][CACHE_SIZE];
    int segBits,segIdx;

for(int i=0;i<16;i++)
        cache[i][threadIdx.x] = 0;
    __syncthreads();

for(int idx =threadIdx.x;idx < rows;idx+=blockDim.x)
        for(int i=0,k=rows*(blockIdx.x<<4)+idx;i<16;i++,k+=rows)
            cache[i][threadIdx.x] += A[k]*v[idx];
    __syncthreads();

// reduction, inside each block
    segBits = CACHE_SIZE_LOG-1;
    //first stage of reduction: wrapping oversplitted threads for(int iter=1,nOps=8;iter<4;iter++,nOps>>=1){
        segIdx =threadIdx.x>>segBits;
        for(int i=segIdx*nOps, idx=threadIdx.x-(segIdx<<segBits);i<segIdx*nOps+nOps;i++)
            cache[i][idx] += cache[i][idx+(1<<segBits)];
        segBits--;
        __syncthreads();
    }
    // second stage of reduction: one-op-per-thread
    while(segBits>1) { // 16 segments
        segIdx =threadIdx.x>>segBits;
        if (segIdx < 16)
            cache[segIdx][threadIdx.x-(segIdx<<segBits)] += cache[segIdx][threadIdx.x-(segIdx<<
            segBits) + (1<<segBits)];
        segBits--;
        __syncthreads();
    }
    if (threadIdx.x <16)
        out[(blockIdx.x<<4)+threadIdx.x] = cache[threadIdx.x][0]+cache[threadIdx.x][1]+cache[
        threadIdx.x][2]+cache[threadIdx.x][3];
}
```

FIG. 10B

ABSTRACT

MULTIPLE-CACHE PARALLEL REDUCTION AND APPLICATIONS

CROSS-REFERENCE TO RELATED APPLICATIONS

This application is a non-provisional patent application and claims the benefit of U.S. Provisional Pat. App. Ser. No. 61/673,980, filed Jul. 20, 2012, and incorporated herein by reference.

FIELD OF THE INVENTION

The present invention relates generally to computing. More particularly, the present invention relates to a framework for multiple-cache parallel reduction for use in numerous computing applications.

BACKGROUND OF THE INVENTION

Parallel processing refers to the division of a data processing task among multiple computer processors in order to decrease the amount of time required to complete the processing task. Graphics processing units ("GPUs") have multiple processors and can therefore be used to parallelize data, either alone or together with one or more dedicated computer processing units ("CPUs"). A typical approach for GPU data-parallelism is to construct a grid (or NDrange in OpenCL terminology) in which each thread is in charge of a single data element. This formulation has its own advantage of being simple and is suitable for simple parallel problems where data elements are processed independently such as color transform, pixel thresholding, image subtraction and so on. For more complicated problems which involve neighboring pixels and reduction (like the block matching problem being discussed), this simple approach has several drawbacks. First, matching a block (or filtering) at two adjacent pixels will create data access overlaps, which will increase latency because parallel threads have to wait for each other to access the same memory address. Second, the size of the block to be matched introduces another dimension for parallelization, and exploiting this dimension (rather than adhere to the image dimensions) may be more effective.

Third, the reference image may be very large in real application, for example tens of Megapixels, which surpasses the maximum grid dimensions of any CPU. In order to cover the whole image, the program must contain mixed host code (on the CPUs) and device code (on the GPUs) to recursively or iteratively process all portions of the image. This introduces more complexity to the design and implementation of the parallel program.

It would therefore be advantageous to provide a new method for multiple-cache parallel computing to reduce the number of steps needed to execute a thread and provide a more efficient computing process.

SUMMARY OF THE INVENTION

The foregoing needs are met, to a great extent, by the present invention, wherein in one aspect a method for providing parallel computing includes running a computing application on a computing device having x of caches, wherein said computing application comprises y threads to be executed. The method can also include determining a number of threads that can be executed using n caches, wherein t is the number of threads and n is less than x. The method also includes executing t threads using n caches. An additional step can include subtracting t threads from y threads to yield s remaining threads and executing s remaining threads in parallel using x-n caches. The method can also be performed on a system including a computing device having at least one cache.

In accordance with an embodiment of the present invention, the method can further include executing image filtering, block matching, features detection, and/or morphological operators. The method can also include executing a thread folding algorithm such that the s remaining threads can be executed in parallel. The method can also include the execution of t threads and s threads, while a thread 0 of the program is executed.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIGS. 10A and 10B illustrate exemplary code according to an embodiment of the present invention;

DETAILED DESCRIPTION

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In accordance with an aspect of the present invention, a method and system for parallel computing is provided, that reduces the time necessary for the execution of program function. In order to reduce the time needed to execute aspects of a program, multiple program threads are executed simultaneously, while thread 0 of the program is also executed. These threads are executed simultaneously with the aid of at least one cache of the computing device on which the program is being run. Such a framework reduces wasted computing power and the time necessary to execute aspects of a program. The disclosed systems and associated exemplary frameworks may be implemented on any suitable GPU or CPU architecture, including NVIDIA Compute Unified Device Architecture (CUDA), OpenCL by Khronos Group, and MICROSOFT DirectCompute.

Figure 1:
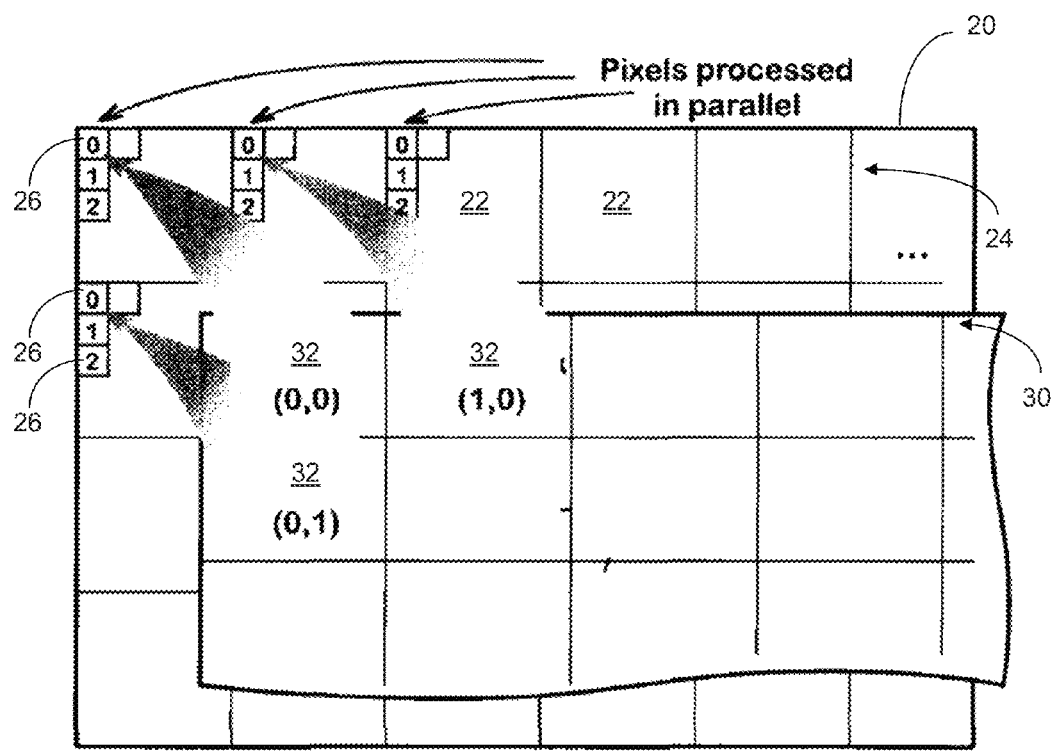
FIG. 1 illustrates a schematic view of parallelization framework for block matching, according to an embodiment of the present invention.

In one embodiment, illustrated in FIG. 1, a parallelization framework for block matching is implemented to provide more efficient computing. A data domain, such as an image 20, is divided into equal size parts, referred to herein as image blocks 22, by a lattice, referred to herein as an image grid 24. The image grid 24 is separate from and not to be confused with the GPU's grid 30 of thread blocks 32. The dimensions of image blocks 22, which correlates to column and row distances in the image grid 24, are chosen such that the total number of image blocks 22 is always smaller than the maximum number of thread blocks 32 per GPU. As a result, an image block 22 has a corresponding GPU thread block 32 that will attend the matching calculation for every pixel 26 in the image block 22. Each thread in the GPU thread block 32 is in charge of 1 pixel 26 in the image block 22. In some embodiments, the image block size (that is, the number of pixels 26 in an image block) is less than the maximum number of threads in a GPU thread block 32, so that there are sufficient threads to cover all image block 22 pixels 26. The case where the image block size is larger than this limit is discussed further herein.

In the framework of the present invention, the GPU grid 30 of thread blocks 32 can be decoupled from the image grid 24. The GPU's thread indices (threadIdx.x and threadIdx.y in CUDA terms) are used to enumerate the pixels 26 in the image block 22, while the block indices (blockId.r-.x and blockIdx.y in CUDA terms) are used to navigate the image blocks 22 in the data domain (i.e. the image 20). That is to say, threads in a GPU's thread block GBlock(m, n) are in charge of calculating matching measures for all the pixels 26 in the image block IBlock(m, n) of size $B^2$. One suitable measure is the Sum of Absolute Difference (SAD), according to the definition:

$$SAD(x, y) \triangleq \|P - P^{(x,y)}\|_1 = \sum_{i,j} |P_{i,j} - P^{(x,y)}_{i,j}|, \forall (x, y) \in \Omega_I$$

Where P is a thumbnail image that we want to match, and $P^{(x,y)}$ is the image patch of the same dimension as P, at the location (x,y) inside the image domain $\Omega_I$. In embodiments where the exemplary framework conforms with the indexing convention in CUDA programming, x can be the index in the first dimension (row), and y can be the index for the second dimension (column) of the image 20.

Because all threads may be required to compute a single SAD, each thread is therefore involved with the calculations of $B^2$ SADs in the corresponding image block 22. Threads only synchronize within their blocks 32, so SAD calculations can be done independently for pixels 26 at the same relative location in different image blocks 22. In other words, the computations for pixels 26 at (0, 0), (0, B), (B, 0) . . . can be performed in parallel. The next batch of parallel computations is shifted 1 pixel to (1+kB, hB) $\forall k, h \in \mathbb{N}$, and so on until all the pixels 26 in the image 20 are covered (i.e. when the final shift ((B−1)+kB, (B−1)+hB) is finished). A device driver can schedule thread execution using any suitable scheduling approach to maximize parallel throughput.

Figure 2:
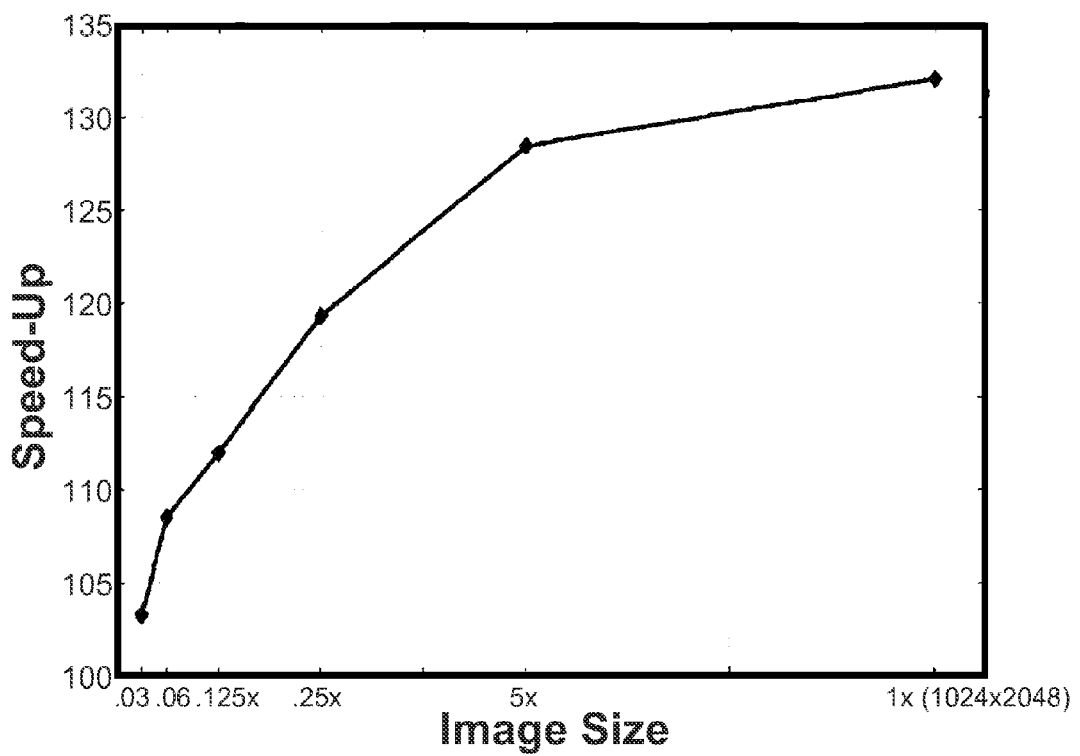
FIG. 2 illustrates a graphical view of block matching speed-up, according to an embodiment of the present invention.

FIG. 2 is a graph of a speed-up of processing of images at different image sizes, wherein an exemplary embodiment of the framework of the present invention is used to implement and execute a matching problem. The processing times in the exemplary embodiment are compared to a pure Matlab approach. In this example, the matching problem is implemented in pure Matlab code and in mixed Matlab-kernel code, where the core matching is in GPU kernel code and all other code is in Matlab. The graph shows the exemplary embodiment is between 100 and almost 135 times faster than a pure Matlab implementation. This experiment was performed in a desktop computer equipped with an AMD Phenom II X6 1055T processor and an EVGA GTX 460 SE mid-range gaming card.

Figure 3:
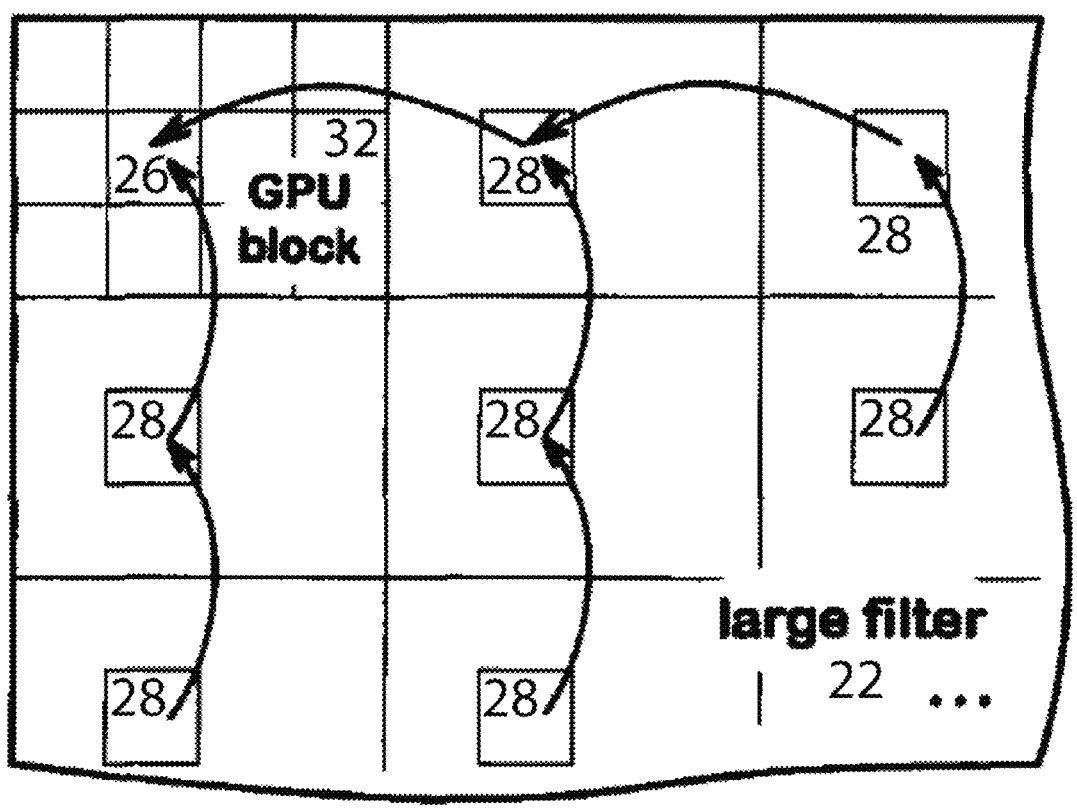
FIG. 3 illustrates a schematic view of an image handling large filter, according to an embodiment of the present invention.

In order to perform SAD or filtering on a larger image patch, a thread can be allowed to monitor more than one pixel in the image block as illustrated in FIG. 3. Before reduction, the absolute differences at the out-of-range pixels 28 can be summed towards their corresponding pixels 26 within range. The later reduction stage only has to calculate the SAD on a smaller thumbnail (that has the same size as the maximum GPU block 32 size). Since the addition is an associative operation, the final result is the same as doing SAD on the original (large) thumbnail image 22. The intermediate summing is done in parallel for every thread, therefore the overhead in runtime is minimal.

Figure 4A:
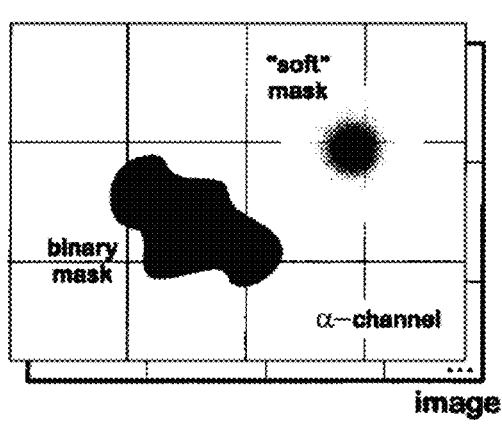
FIGS. 4A and 4B illustrate schematic diagrams of block matching with various parallel frameworks according to an embodiment of the present invention.

Sometimes, it is intentional that SAD calculation is done only on a sub-domain of input data. This feature can be incorporated easily into the framework of the present invention via two instruments: α-channel and Region-Of-Interest (ROI). An α-channel may include a mask or binary map that indicates the participation of each data element in $\Omega_I$, usually with a value 1 for pixels to be included and value 0 to be excluded. The map can also be generalized to grayscale values to enable more continuous effects on input data. Given an α-channel, the SAD formula becomes:

$$SAD(x, y) = \alpha(x, y)\|P - P^{(x,y)}\|_1 = \alpha(x, y)\sum_{i,j} |P_{i,j} - P^{(x,y)}_{i,j}|, \forall (x, y) \in \Omega_I$$

where P, $P^{(x,y)}$, and $\Omega_I$ are defined as described above. The framework with the α-channel addition is illustrated in FIG. 4A.

Region-Of-Interest is another option to indicate the input sub-domain P in case it is concentrated and can be described by a simple geometric structure, such as a rectangle 48. The SAD formula becomes:

$$SAD(x, y) = \sum_{i,j} |P_{i,j} - P_{i,j}^{(x,y)}|, \forall (x, y) \in \Omega_{ROI}$$

Figure 4B:
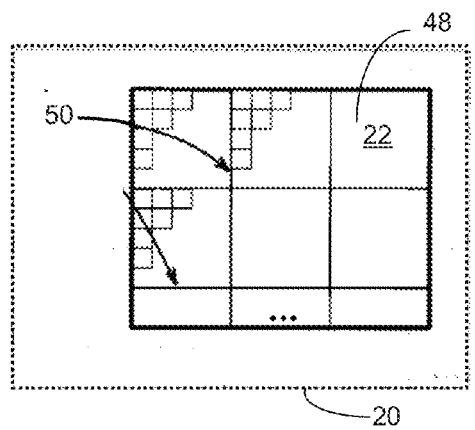

The parallel framework can be adjusted by starting the image grid 50 at the top left corner of the ROI 48, rather than at the beginning of the image 20, as illustrated in FIG. 4B.

Block Matching has been used so far as a typical example to explain the present invention and it is by no means the limit on what the framework can apply. Instead, the proposed framework of the present invention is readily applicable to a wide range of image processing applications. One such exemplary application is image filtering, one of the fundamental operations in image processing. In image filtering, an image is convolved with a 2-dimensional filter to achieve some effects, for example smoothing, sharpening, noise removal, special geometrical effects, and so on. The Block Matching application discussed above is one of the special cases of image filtering, where the SAD calculation is regarded as the combination of an image-block subtraction and a convolution with a 2-D filter whose entries are all one. In general, the calculation (to be parallelized) in filtering is written as:

$$F(x, y) = \sum_{i,j} h(i, j)I(x - i, y - j), \forall (x, y) \in \Omega_I$$

where h(., .) is the 2-D filter, and I and F are the images before and after filtering respectively. The origin 0 of the filter is usually assumed to be at its center, the indices (i, j) hence cover both negative and positive ranges.

Another exemplary application is features detection, an essential pre-processing step in many Computer Vision algorithms. The image features are normally edges and corners which are detected by edge and corner detection filters. The detection operations are usually preceded by image enhancement filtering steps. All of those operations, whether linear or non-linear, can be modeled by a series of pixel-wise operations and then reduction on a 2-D array, which is readily parallelizable on the framework of the present invention.

Another exemplary application is for morphological operators, which are popular non-linear operators used in medical image processing and other applications. The two most important operators are erosion and dilation; and many other operators are built upon these two primitives (for example image opening, closing, outlining, skeletonization . . . ). Erosion and dilation are basically non-linear filtering using 2-D binary structure elements, hence both parallelizable in the proposed framework. Other erosion- and dilation-based functions are therefore also implementable in our parallel framework, either directly or indirectly by using host code to combine multiple parallelized operations.

Assuming that there are ample threads that can be started at the same time in parallel, an exemplary framework according to the present disclosure can be used to find a parallelization that minimizes the run time of the parallel vector sum for reduction of the dimension of input data. For the vector sum problem, the best approach to date is to apply the divide-and-conquer strategy to finish the sum. At the first step, the long summation of N elements is factored into N/2 2-operand sums of element pairs. Because these pairwise sums are mutually independent, they can be done in parallel in 1 iteration. After this step, the number of operands in the summation is reduced by half. The process repeats until the sum reduces to 1 element, which is also the final output. Since $N=2^K$ and we use binary divide-and-conquer, only $K=\log_2(N)$ iterations are needed to fulfill the summation.

In general, the input memory buffer cannot be used to store intermediate results because that will destroy the original data. Instead, a cache memory is allocated for this purpose. The shared memory in the CUDA's memory model is a perfect candidate. The fast read/write speed on shared memory (hundreds of times faster than global memory) is another strong reason why cache memory is widely used in reduction. This binary parallel reduction approach will be referred to as "single-cache reduction" for the purposes of the present invention to differentiate from the "multiple-cache reduction" algorithm that is described herein.

Figure 5:
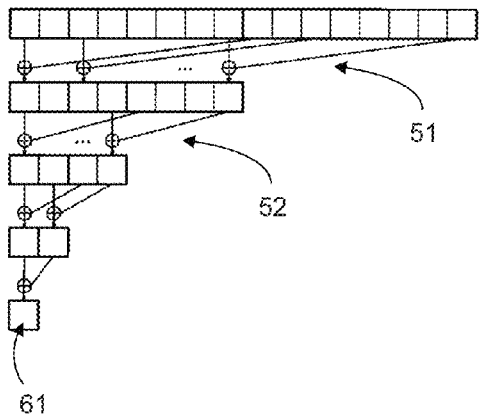
FIG. 5 illustrates a schematic diagram of a single-cache binary reduction according to an embodiment of the present invention.
Figure 6:
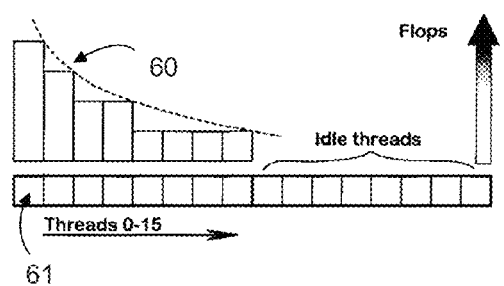
FIG. 6 illustrates a schematic diagram of an unbalanced workload in a single-cache reduction, according to an embodiment of the present invention.

In an exemplary implementation of the present invention, a binary reduction can be used for both single-cache and multiple-cache reduction. FIG. 5 illustrates a single-cache binary reduction, according to an embodiment of the present invention. At Iteration 1, denoted as 51, the N/2 pairwise sums are processed using the first N/2 threads. At Iteration 2, denoted as 52, the number of active threads is reduced to N/4, and so on. The process stops after Iteration K, when the number of active threads is N/N=1 and everything is summed into the $0^{th}$ cache element. Since the runtime of a parallel program is governed by the slowest thread, the time required for binary reduction is the runtime of thread 0. FIG. 6 illustrates an unbalanced workload in a single-cache reduction and a histogram of the workload 60 of each thread. It is clear that thread 0, denoted as 61, is the most hard-working, while the workload of subsequent threads reduces in a negative logarithm curve as the thread index increases, and half of the threads never participate in the reduction.

Once a thread fulfills its task, it still has to wait for thread 0 to finish. In other words, its computing power is wasted. This computing power can be utilized within the framework of the present invention by using task-parallelism, as described further herein. If multiple reductions are combined into one complex problem, the spare computing power can be applied in one reduction to execute other reduction jobs.

Figure 7:
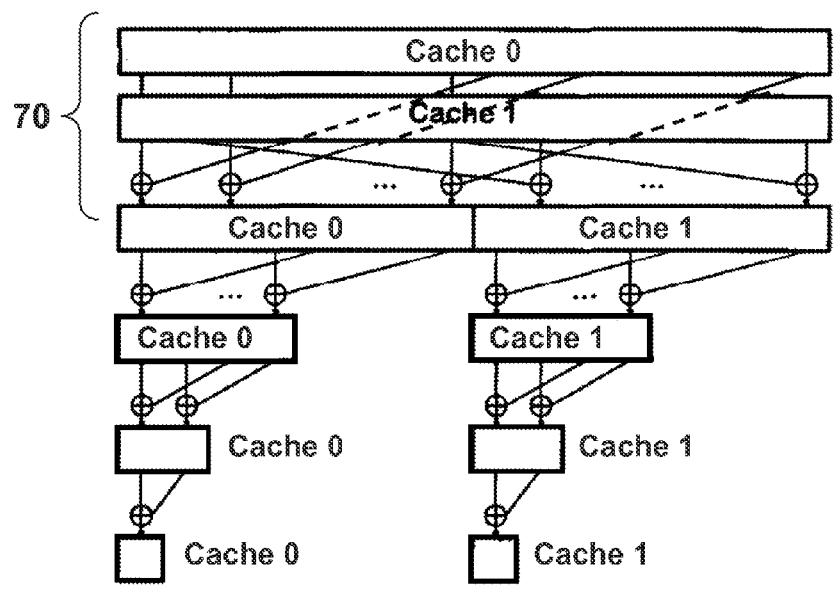
FIG. 7 illustrates a schematic diagram of two-cache binary reductions according to an embodiment of the present invention.

FIG. 7 illustrates the proposed approach with a kernel that performs a two-cache (denoted as Cache 0 and Cache 1) binary reduction. An exemplary kernel with two reductions may be the simplest generalization, as half of the threads are idle in a single reduction. Using those spare threads for the second reduction is beneficial while introducing no additional iterations. The overall runtime is still O(K) while two reductions are achieved instead of one. At Iteration 1, denoted as 70, all threads are active, but from Iteration 2, once again wasted threads begin to appear. According to the present disclosure, the number of reductions in the kernel can be doubled (i.e. to four concurrent reductions) to apply the wasted threads.

Figure 8:
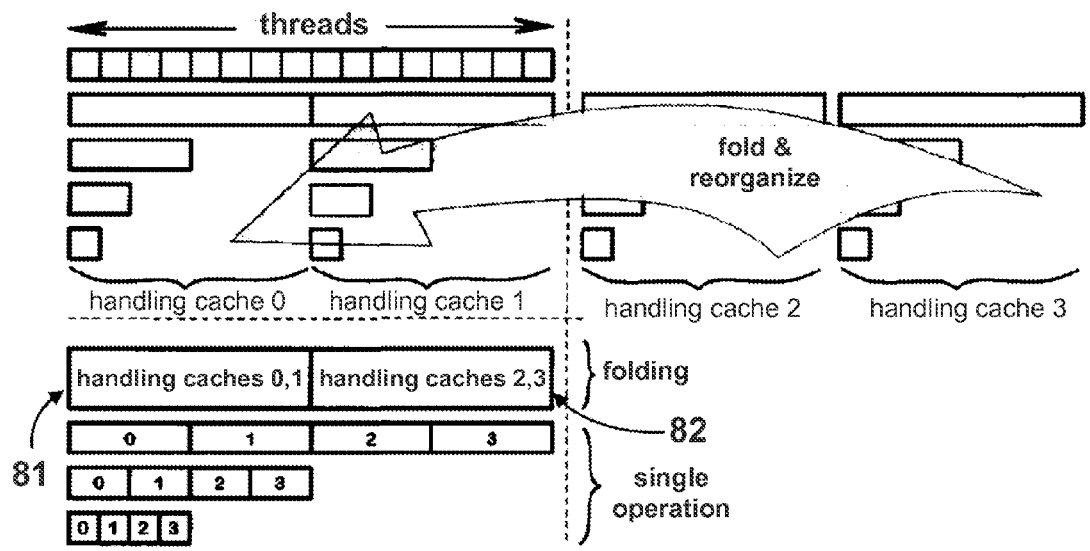
FIG. 8 illustrates a schematic diagram of multiple-cache binary reductions according to an embodiment of the present invention.

Referring to FIG. 8, at four concurrent reductions, a new difficulty emerges: at Iteration 1, the total number of pairwise additions can be twice the number of threads. In order to fit the computation into this block of threads, each thread can be allowed to perform two pairwise additions. For the convenience of later referencing, this process is referred to as thread folding. From Iteration 2, each thread only serves in one reduction, so there is no thread folding from this iteration onwards. In the figure, the horizontal bars represent batches of active threads, and the numbers they bear indicate the number of each reduction in which they are participating. For example, a first thread batch 81 handles the reductions in caches 0 and 1 and a second thread batch 82 handles the reductions in caches 2 and 3 during Iteration 1. For more effective memory access, all active threads can be pushed towards index 0. For each reduction, a cache memory stores intermediate results.

Figure 9:
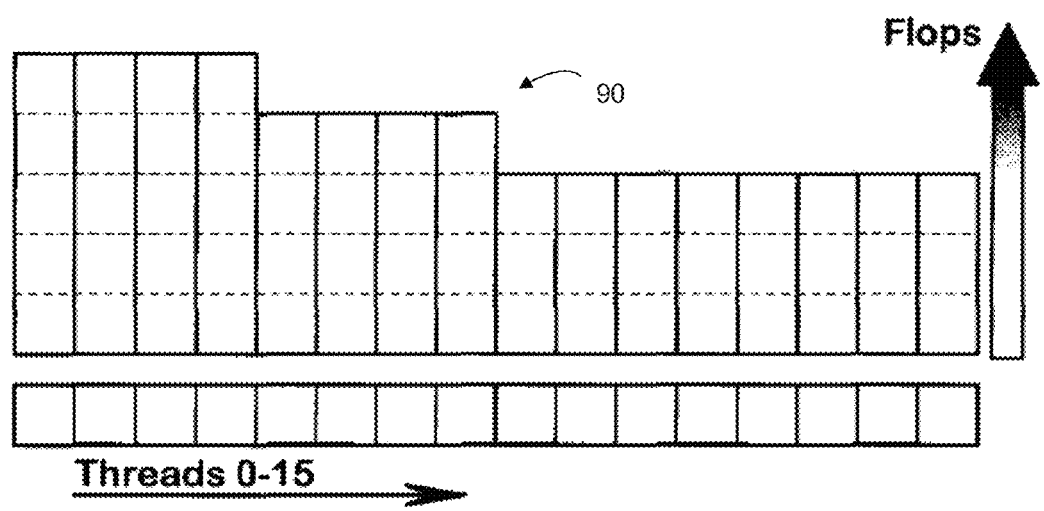
FIG. 9 illustrates a schematic diagram of workload distribution in an exemplary 4-cache embodiment according to the present invention.

Four caches (denoted as Cache 0, Cache 1, Cache 2, and Cache 3) are used in the kernel of FIG. 8, hence the name "multiple-cache kernel." Normally, all caches are allocated in the share memory of the multi-processor for fast memory access. Therefore, the maximum number of caches is only limited by the maximum size of shared memory. For example, as of 2012, most of the gaming GPUs allowed 16 KB shared memory per block. FIG. 9 illustrates how the thread workload 90 changes in the 4-cache kernel of FIG. 8, as contrasted with the single-cache binary reduction workload 60 of FIG. 6.

Due to thread folding, a multiple-cache reduction algorithm can contain two main stages. The first stage manages thread folding. The number of Flops per thread (nFlops) is reduced by half after each iteration in this stage. Once nFlops is reduced to one, the second or single-operation stage can carry out regular binary reductions using appropriate segments of threads. FIG. 10A illustrates an example pseudo-code for a kernel that performs $2^{Kc}$ vector summations at once, and FIG. 10B illustrates further exemplary code for executing the present parallel computing application.

For the exemplary algorithm implementation, both the vector length N and the number of caches C are assumed to be powers of 2: $N=2^K$ and $C=2^{Kc}$. With single-cache reduction, the time $T_{single\_cache}(C)$ needed to finish C vector summations is simply linear in C. In this calculation, overhead time that is unrelated to the reduction processes (e.g. memory allocation, data input/output, etc.) can be ignored:

$$T_{single\_cache}(C) = C \log_2 N = K$$

For multiple-cache implementation, again the thread 0 is still the slowest and its runtime can be used to determine the runtime of the whole algorithm. Thread 0 runtime $T_{multi\_cache}(C)$ includes two parts that correspond to the two (thread folding and single operation) stages:

$$T_{multi\_cache}(C) T_{folding}(C) + T_{single\_op}(C)$$

At Iteration 1, thread 0 has to do $C/2 = 2^{Kc-1}$ Flops. At Iteration 2, this reduces to C/4, and so on. It will take $K_C-1$ iterations to finish the first stage, and during this stage, the total Flops that thread 0 has to execute is:

$$T_{folding}(C) = \frac{C}{2} + \frac{C}{4} + \ldots + 2$$
$$= 2^{K_C-1} + 2^{K_C-2} + \ldots + 2^1$$

In the second stage, thread 0 only has to do 1 Flop at each iteration. There are $K-K_C+1$ Flops left in this stage, so:

$$T_{single\_op}(C) = K - K_C + 1$$

Combining the two stages, we have:

$$T_{multi\_cache}(C) = \underline{2^{K_C-1} + 2^{K_C-2} + \ldots + 2^1 + 1} + K - K_C$$
$$= (2^{K_C} - 1) + K - K_C$$
$$= C - 1 + K - \log_2 C$$

Figure 11A:
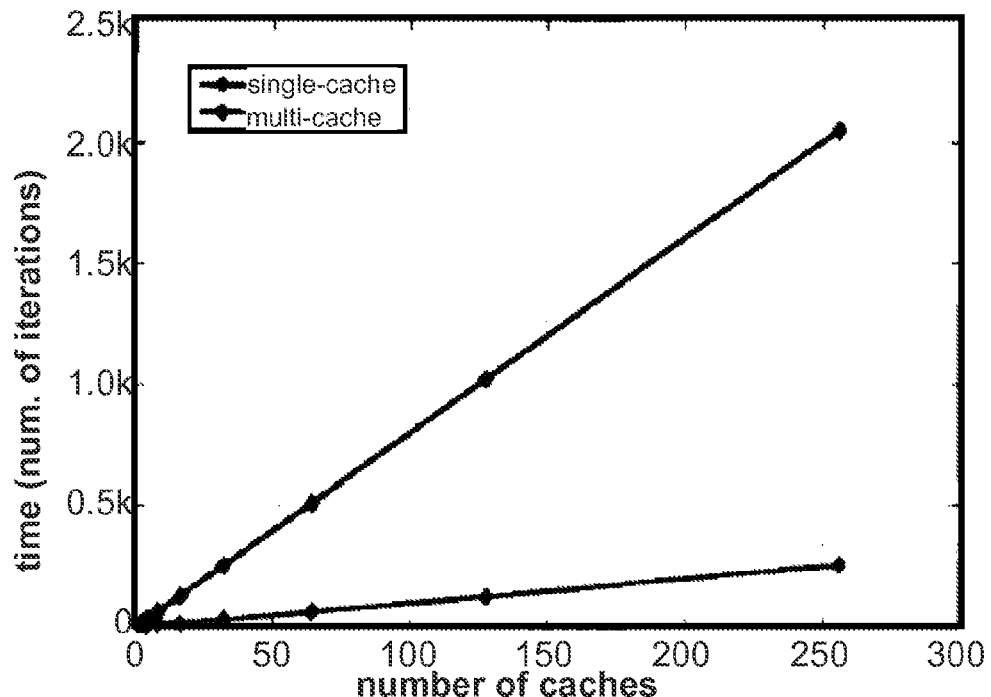
FIGS. 11A and 11B illustrates a graphical view of theoretical improvement of a multiple-cache reduction, according to an embodiment of the present invention.
Figure 11B:
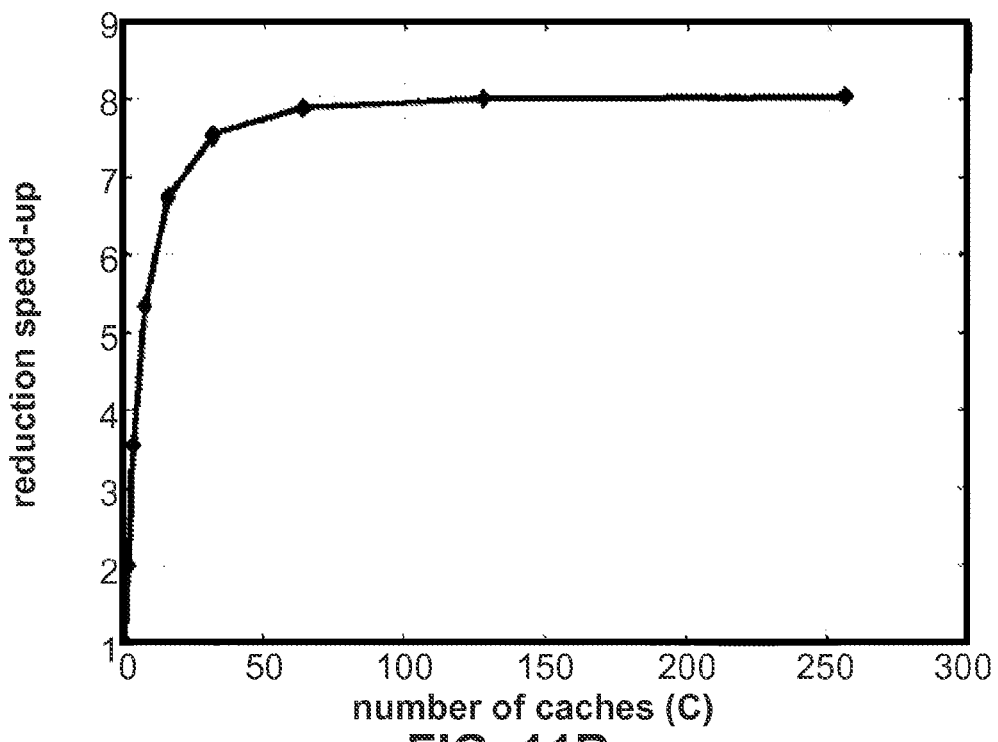

The above analysis implicitly assumes that $K_C \leq K$ (and hence $C \leq N$). It is an interesting case when $C=N$, wherein the second stage nearly annihilates and the runtime is $T_{multi\_cache}(C) = C - 1$. The workloads in this case are fully balanced, which means the spare computing power has been fully exploited and there are no threads left idle waiting for thread 0 to finish. FIGS. 11A and 11B illustrate the improvements over single-cache for different values of C in a kernel where the given block size is 256, or the number of iterations is K=8.

In an exemplary application of the exemplary framework, the run time of the product between a row vector $x \in \mathbb{R}^N$ and a matrix $A \in \mathbb{R}^{N \times M}$ will be improved. Each product between x and a column of A is a single reduction, so M vector-column products are a suitable environment for the multiple-cache approach to demonstrate its strength. Both vector x and matrix A can be generated using Matlab's random generator.

Figure 12:
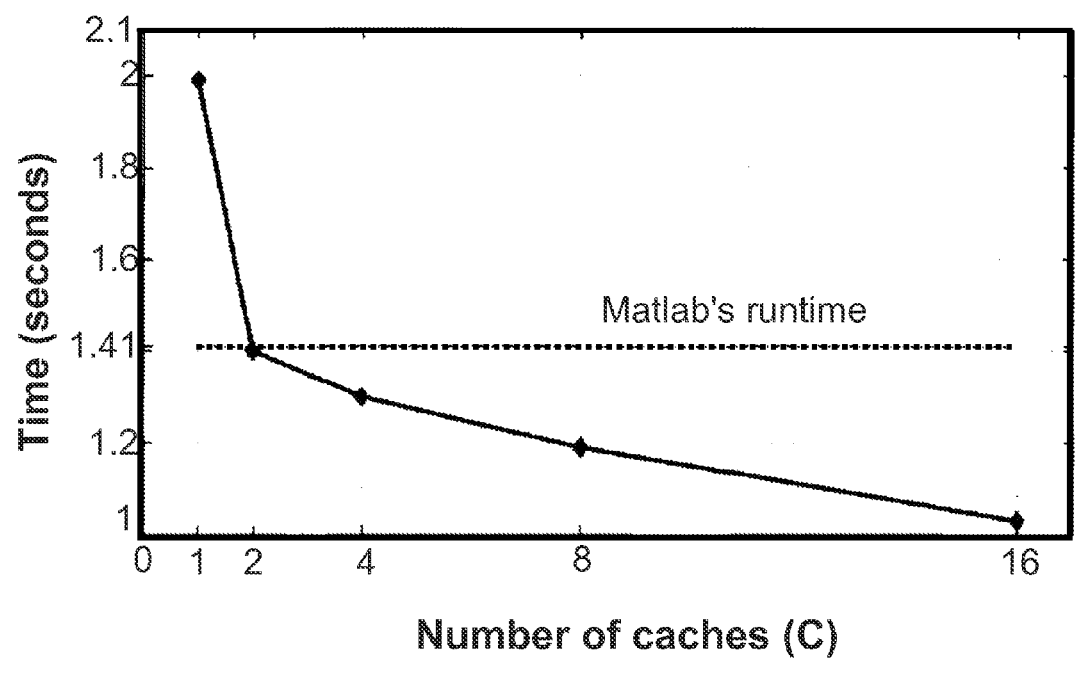
FIG. 12 illustrates a graphical view of vector-matrix multiplications using a multiple-cache approach according to an embodiment of the present invention.

Kernels with C=1, 2, 4, 8, 16 are implemented in CUDA C and compiled to Parallel Thread eXecution (PTX) code, which is pseudo-assembly code for Nvidia's GPU. These compiled kernels can be invoked in Matlab via the support of Parallel Processing Toolbox to take advantage of the Nvidia GPU's computing power without sacrificing the convenience of a scientific computing environment such as Matlab. To avoid dealing with unnecessary padding, the matrix sizes can be chosen so that M is a multiple of C and N is a power of 2. In the experiment results illustrated in FIG. 12, the matrix dimensions are 512×102400. CUDA block is 1-dimension and contains 256 threads (which means K=8). All floating point operations are in single-precision. Each vector-matrix product is repeated 200 times to have a better runtime estimate. Runtime of the Matlab's GPU implementation of y=xA is also provided to show that this approach can actually outperform one of the best implementations of the same problem. The Matlab's runtime in traditional CPU code is 9.12 seconds.

Figure 13A:
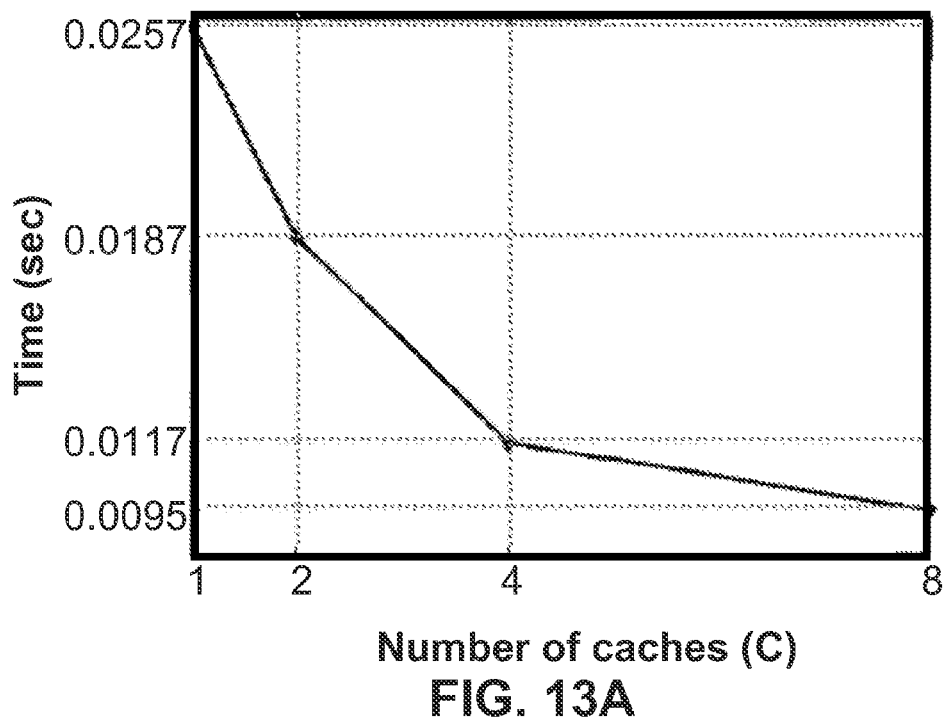
FIGS. 13A and 13B illustrate a graphical view of block matching with multiple-cache CUDA kernel performances.
Figure 13B:
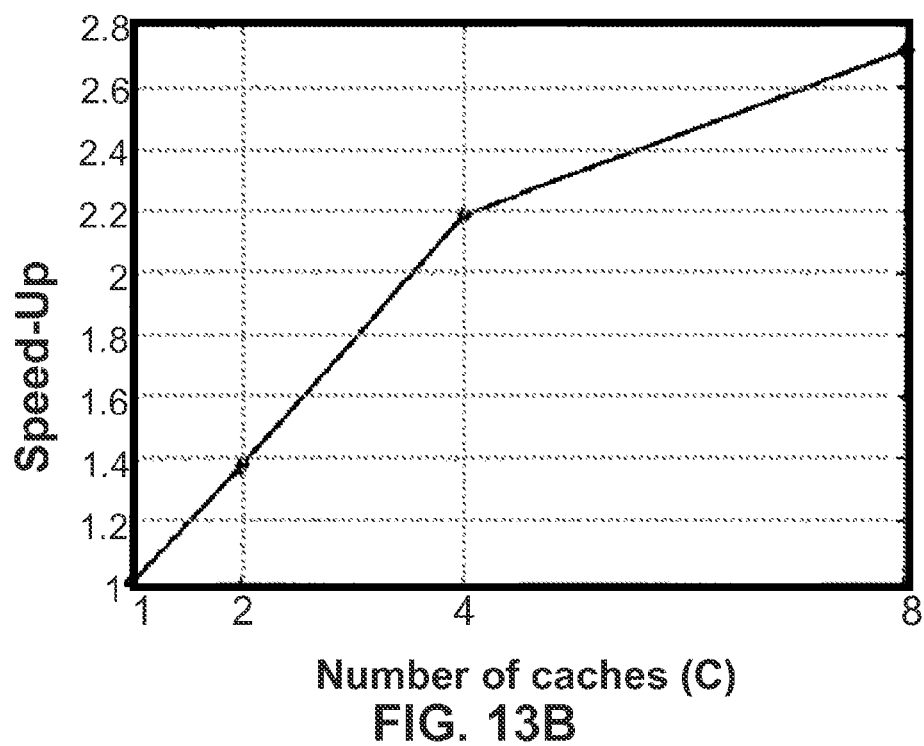

Another problem that the multiple-cache solution solves is the Block Matching problem mentioned above (and with it all other applicable problems such as image filtering, features detection, and the like). SAD calculation at each pixel is a reduction, therefore multiple reductions can be exploited either along rows or columns of the image. In particular, task-parallelism can be exploited along the columns, so a C-cache kernel can calculate SADs for C pixels adjacent in a column at a time. FIGS. 13A and 13B illustrate the improvement of the multiple-cache Block Matching kernels over single-cache implementations. In this experiment, the image block size (and hence the kernel size) is limited to 16×16 in order to increase the number of caches to eight. The image in use is the grayscale version of the pepper image shipped with Matlab, which has the dimension of 384×512 pixels.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for providing parallel computing of a computing application on a computing device having a plurality of caches, the computing application having a plurality of threads to be executed, the method comprising:

executing a first set of the plurality of threads on data in a first set of the plurality of caches, the first set of caches containing a first number of the plurality of caches less than all of the plurality of caches, and the first set of threads containing a number of the plurality of threads that can be executed in a first cache of the first set of caches, the first set of threads being executed in parallel on the data in each cache of the first set of caches; and executing, in parallel on data in the one or more caches that are not in the first set of caches, each thread of the plurality of threads that is not in the first set of threads.

2. The method of claim 1 further comprising executing image filtering.

3. The method of claim 1 further comprising executing features detection.

4. The method of claim 1 further comprising executing morphological operators.

5. The method of claim 1 further comprising executing block matching.

6. The method of claim 5 wherein executing block matching comprises:

dividing a data domain into a plurality of equal sized parts; and assigning a thread block to each part, each of the thread blocks comprising one or more of the plurality of threads, the threads of each thread block being configured to calculate matching measures for data in the part to which the thread block is assigned;

wherein executing the set of the plurality of threads comprises calculating, in parallel, matching measures for data at a relative location that is the same in each part.

7. A method for providing parallel computing of a computing application on a computing device having a plurality of caches, the computing application having a block of threads, the method comprising using the threads to perform, in parallel, a plurality of binary reductions of data in the plurality of caches, the performing of the plurality of binary reductions comprising:

in a first iteration, using a first thread batch comprising a plurality of the threads to reduce data in a first cache of the plurality of caches;

in the first iteration, using a second thread batch comprising a plurality of the threads to reduce data in a second cache of the plurality of caches, the plurality of threads of the second thread batch being discrete from the plurality of threads of the first thread batch;

in the first iteration, using the first thread batch of the threads to reduce data in a third cache of the plurality of caches; and in the first iteration, using the second thread batch to reduce data in a fourth cache of the plurality of caches.

8. The method of claim 7, wherein reducing data in the first and third caches in the first iteration comprises:

for each thread in the first thread batch, using the thread to perform a first pairwise addition on data in the first cache and to perform a second pairwise addition on data in the third cache.

9. The method of claim 8 wherein:

in a second iteration after the first iteration, the first thread batch further reduces data in the first and third caches and the second thread batch further reduces data in the second and fourth caches.

10. The method of claim 9 wherein further reducing data in the first and third caches in the second iteration comprises:

for each thread in the first thread batch, using the thread to perform a pairwise addition on data in either the first cache or the third cache.

11. The method of claim 7 wherein the plurality of binary reductions each comprise:

a first stage comprising thread folding, wherein each thread performs a plurality of pairwise additions on data in a plurality of the caches; and a second stage comprising single operations, wherein each thread performs zero or one pairwise addition on data in one of the caches.

12. A system for parallel computing, the system comprising:

a computing device having a plurality of caches and one or more thread blocks including a first thread block comprising a plurality of threads, the computing device being configured to use the threads to perform, in parallel, a plurality of binary reductions of data in the plurality of caches by:

using a first thread batch comprising a plurality of the threads to reduce data in a first cache of the plurality of caches;

using a second thread batch comprising a plurality of the threads to reduce data in a second cache of the plurality of caches, the threads of the second thread batch being discrete from the threads of the first thread batch; and executing a thread folding algorithm such that one or more of the plurality of threads each reduces data in a plurality of the caches in parallel.

13. The method of claim 12, wherein executing the thread folding algorithm comprises:

using the first thread batch to reduce data in a third cache of the plurality of caches in parallel with the first thread batch reducing data in the first cache; and using the second thread batch to reduce data in a fourth cache of the plurality of caches in parallel with the second thread batch reducing data in the second cache.

* * * * *